United States Patent
Yamazaki et al.

(10) Patent No.: US 8,791,975 B2
(45) Date of Patent: Jul. 29, 2014

(54) OPTICAL SCANNING DEVICE AND IMAGE FORMING APPARATUS

(75) Inventors: Kozo Yamazaki, Hyougo (JP); Kouji Terasawa, Iwate (JP)

(73) Assignee: Ricoh Company, Ltd., Tokyo (JP)

( * ) Notice: Subject to any disclaimer, the term of this patent is extended or adjusted under 35 U.S.C. 154(b) by 940 days.

(21) Appl. No.: 11/831,105

(22) Filed: Jul. 31, 2007

(65) Prior Publication Data

US 2008/0025750 A1 Jan. 31, 2008

(30) Foreign Application Priority Data

Jul. 31, 2006 (JP) ................... 2006-208462

(51) Int. Cl.
*B41J 27/00* (2006.01)
*B41J 2/435* (2006.01)

(52) U.S. Cl.
USPC ............................. 347/263; 347/259; 347/260

(58) Field of Classification Search
USPC ........................................ 347/259, 260, 263
See application file for complete search history.

(56) References Cited

U.S. PATENT DOCUMENTS

| | | | |
|---|---|---|---|
| 4,853,710 A | 8/1989 | Shimada | |
| 4,896,168 A * | 1/1990 | Newman et al. | 347/245 |
| 5,510,827 A * | 4/1996 | Kubota et al. | 347/257 |
| 6,195,190 B1 * | 2/2001 | Tachibe et al. | 359/216.1 |
| 6,922,538 B2 * | 7/2005 | Kimura | 399/94 |
| 7,019,878 B2 | 3/2006 | Mikami | |
| 7,149,453 B2 | 12/2006 | Fujita | |
| 7,215,349 B2 | 5/2007 | Sakaue | |
| 7,554,569 B2 * | 6/2009 | Shinozaki | 347/263 |
| 7,945,186 B2 * | 5/2011 | Kimura | 399/92 |
| 2004/0075733 A1 * | 4/2004 | Nebosis | 347/261 |
| 2004/0100550 A1 | 5/2004 | Bannai | |
| 2004/0175202 A1 * | 9/2004 | Fujita | 399/92 |
| 2005/0052719 A1 * | 3/2005 | Tomita et al. | 359/205 |
| 2006/0055769 A1 | 3/2006 | Yamazaki | |

FOREIGN PATENT DOCUMENTS

| | | |
|---|---|---|
| JP | 62-104220 | 7/1987 |
| JP | 06-015870 | 1/1994 |
| JP | 06-075184 | 3/1994 |
| JP | 10-239611 | 9/1998 |
| JP | 11-052267 | 2/1999 |
| JP | 11-160644 | 6/1999 |

(Continued)

OTHER PUBLICATIONS

Japanese Office Action for corresponding Japanese application dated May 31, 2013.

(Continued)

*Primary Examiner* — Uyen Chau N Le
*Assistant Examiner* — John M Bedtelyon
(74) *Attorney, Agent, or Firm* — Harness, Dickey & Pierce, P.L.C.

(57) ABSTRACT

An optical scanning device includes a polygon scanner that deflects and scans light beams, a body on which the polygon scanner directly mounted, and a heat dissipating unit that dissipates heat of the deflection scanning unit. The heat dissipating unit is located at a position on an outer surface of the body corresponding to the deflection scanning unit. The body is provided with a pair of wall portions on the outer surface. The wall portions face each other with the heat dissipating unit between them, and extend in a direction in which air blown by an air blowing unit flows to form an air-flow path.

22 Claims, 12 Drawing Sheets

(56) References Cited

FOREIGN PATENT DOCUMENTS

| | | |
|---|---|---|
| JP | 11-326813 | 11/1999 |
| JP | 2001-242408 | 9/2001 |
| JP | 2001-337291 | 12/2001 |
| JP | 2004-262117 | 9/2004 |
| JP | 2004-286823 | 10/2004 |
| JP | 2005-189577 | 7/2005 |
| JP | 2005-266424 | 9/2005 |
| JP | 2006-027011 | 2/2006 |

OTHER PUBLICATIONS

Office Action dated Jul. 6, 2012 by the Japanese Patent Office for Application No. 2006-208462.

* cited by examiner

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document, 2006-208462 filed in Japan on Jul. 31, 2006.

BACKGROUND OF THE INVENTION

1. Field of the Invention

The present invention relates to an optical scanning device and an image forming apparatus.

2. Description of the Related Art

Among image forming apparatuses, such as copiers, printers, and facsimile machines, some are known that radiate a latent image carrier through deflection scanning with a writing beam according to image information to form a latent image on the latent image carrier and develop the latent image to obtain an image. The optical scanning device for deflection scanning with a writing beam generally includes optical components, such as an imaging lens for forming an image with a writing beam deflected and scanned by a polygon scanner as a deflection scanning unit with polygon mirrors as rotating multifaceted mirrors for deflecting and scanning a writing beam from a light source. These components are housed in a housing, and the housing is covered with a covering member so that dust is not attached to the optical components, such as the imaging lens.

The polygon scanner includes a polygon mirror, a polygon motor that drives the polygon mirror for rotation, and a circuit board having mounted thereon electronic control components for controlling the driving of the polygon motor.

When a writing beam is deflected, this polygon motor rotates at a high speed equal to or higher than 30000 revolutions per minute (rpm), thereby producing heat at the bearing portion of the polygon motor. Also, at the time of driving the polygon motor, the electronic control components on the electronic control components produce heat. Since the optical scanning device is enclosed by the covering member, heat produced at these heat producing portions of the polygon motor (the bearing portion and electronic control components) is accumulated inside the optical scanning device and raises the inside temperature. When the temperature inside the optical scanning device is increased, the optical components, such as the imaging lens, may be deformed by heat. If the optical components are deformed by heat, a writing beam may not be able to form an image on the surface of the latent image carrier. Also, in the case of a color image forming apparatus, each radiation potion on the surface of each latent image carrier is shifted to cause a color shift.

Japanese Patent Application Laid-Open No. 2001-242408 discloses a conventional optical scanning device as explained below. That is, a heat dissipating unit is fixed to a lower case of a polygon scanner unit in which only the polygon scanner is covered by an upper case and the lower case. The body of the optical scanning device on which optical elements and the like are mounted has a convex groove portion for introduction of outside air. The heat dissipating unit protrudes from the bottom surface of this groove portion to mount the polygon scanner unit on the body. An open side of the groove portion of the body is covered to form a duct that is rectangular in cross section. From one side of this duct, outside air is caused to flow into the duct with a fan and others to cool the dissipating unit. With such a configuration of the optical scanning device, heat of the polygon scanner unit is transmitted to the heat dissipating unit via the lower case and is released to outside the device. As a result, an increase in temperature inside the optical scanning device can be suppressed, thereby suppressing heat deformation of the optical components.

However, the conventional optical scanning device has a problem in that the polygon scanner unit enclosed by the lower case and the upper case is mounted on the body, which increases the number of components by the lower case and the upper case, resulting in an increase in the price of the device.

SUMMARY OF THE INVENTION

It is an object of the present invention to at least partially solve the problems in the conventional technology.

According to an aspect of the present invention, an optical scanning device includes a light source that emits a light beam, a deflection scanning unit that deflects the light beam in a main scanning direction and scans the light beam on a target surface, a plurality of lenses that is located on an optical path of the light beam from the deflection scanning unit to the target surface, a body that houses the light source, the deflection scanning unit, and the lenses, the deflecting scanning unit being directly mounted on the body, a heat dissipating unit that dissipates heat of the deflection scanning unit, and is located at a position on an outer surface of the body corresponding to the deflection scanning unit, an air blowing unit that blows air, and a pair of wall portions that are located on the outer surface of the body to face each other with the heat dissipating unit between them, and extend in a air-flow direction in which the air flows to form an air-flow path.

According to another aspect of the present invention, an image forming apparatus including an optical scanning device that includes a light source that emits a light beam, a deflection scanning unit that deflects the light beam in a main scanning direction and scans the light beam on a target surface, a plurality of lenses that is located on an optical path of the light beam from the deflection scanning unit to the target surface, a body that houses the light source, the deflection scanning unit, and the lenses, the deflecting scanning unit being directly mounted on the body, a heat dissipating unit that dissipates heat of the deflection scanning unit, and is located at a position on an outer surface of the body corresponding to the deflection scanning unit, an air blowing unit that blows air, and a pair of wall portions that are located on the outer surface of the body to face each other with the heat dissipating unit between the wall portions, and extend in a air-flow direction in which the air flows to form an air-flow path.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. In the following description, the present invention is applied to an electrophotographic printer as an example of an image forming apparatus.

Figure 1:
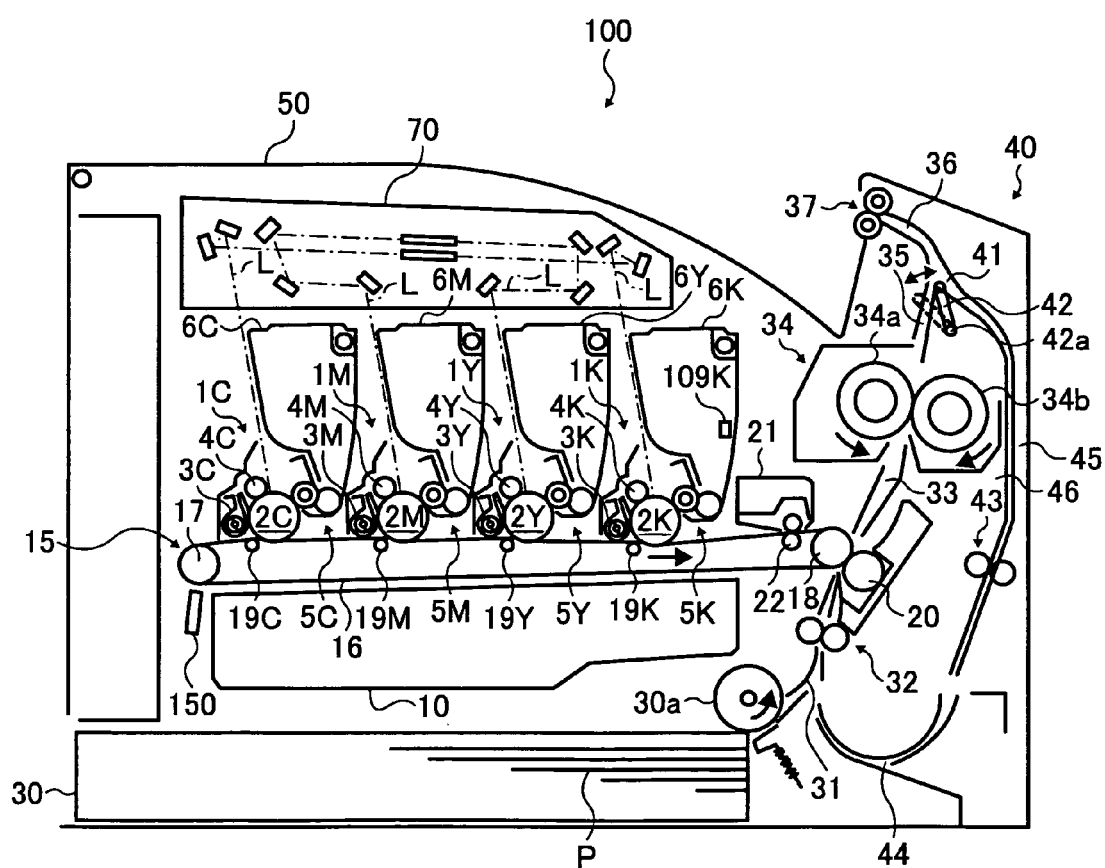
FIG. 1 is a schematic diagram of an image forming apparatus according to an embodiment of the present invention.

FIG. 1 is a schematic diagram of a printer 100 according to an embodiment of the present invention. The printer 100 includes four process units 1K, 1Y, 1M, and 1C for forming toner images of black (K), yellow (Y), magenta (M), and cyan (C), respectively. The process units 1K, 1Y, 1M, and 1C are replaced when reaching their service life.

The process units 1K, 1Y, 1M, and 1C are of basically similar construction except that they use K, Y, M, and C toners of different colors, and thus but one of them, for example, the process unit 1K is described in detail. The process unit 1K includes a drum-shaped photosensitive member 2K as a latent image carrier, a drum cleaning device 3K, a static eliminating device (not shown), a charging device 4K, a developing device 5K as a developing unit, and others. The process unit 1K as an image forming unit can be attached to and removed from the printer 100, and consumable parts can be replaced at one time.

The charging device 4K uniformly charges the surface of the photosensitive member 2K rotated in a clockwise direction in FIG. 1 by a driving unit (not shown). The uniformly-charged surface of the photosensitive member 2K is exposed and scanned with laser light, and carries a black latent image. This black latent image is developed to a K toner image by the developing device 5K using K toner. The K toner used by the developing device 5K is supplied from a toner bottle 6K as a supply toner container that contains unused K toner. The toner image formed on the photosensitive member 2K is subjected to intermediate transfer onto an intermediate transfer belt 16 as an intermediate transfer member. The drum cleaning device 3K removes residual transfer toner attached on the surface of the photosensitive member 2K after the intermediate transferring process. Also, the static eliminating device eliminates residual charges of the photosensitive member 2K after cleaning. With this static elimination, the surface of the photosensitive member 2K is initialized to prepare for the next image formation. In the process units 1 (Y, M, and C) of other colors, (Y, M, and C) toner images are similarly formed on the photosensitive members 2 (Y, M, and C), and are then subjected to intermediate transfer onto the intermediate transfer belt 16.

An optical scanning device 70 is disposed above the process units 1K, 1Y, 1M, and 1C in a vertical direction. The optical scanning device 70 optically scans the photosensitive members 2K, 2Y, 2M, and 2C in the process units 1K, 1Y, 1M, and 1C with laser light L emitted from a laser diode based on image information. With this optical scanning, black, yellow, magenta, and cyan latent images for are formed on the photosensitive members 2K, 2Y, 2M, and 2C. Details of the optical scanning device 70 are explained below.

A transfer unit 15 is disposed under the process units 1K, 1Y, 1M, and 1C in the vertical direction. In the transfer unit 15, an endless intermediate transfer belt 16 is endlessly moved in a counterclockwise direction in FIG. 1 while being stretched. The transfer unit 15 as a transferring unit includes, in addition to the intermediate transfer belt 16, a driving roller 17, a driven roller 18, four initial transfer rollers 19Y, 19M, 19C, and 19K, a secondary transfer roller 20, a belt cleaning device 21, a cleaning backup roller 22, and others.

The intermediate transfer belt 16 is stretched by the driving roller 17, the driven roller 18, the cleaning backup rollers 22 and the four initial transfer rollers 19Y, 19M, 19C, and 19K disposed inside the loop of the intermediate transfer belt 16. With the rotation force of the driving roller 17 driven for rotation by a driving unit (not shown) in a counterclockwise direction in FIG. 1, the intermediate transfer belt 16 is endlessly moved in that direction.

The four initial transfer rollers 19Y, 19M, 19C, and 19K and the photosensitive members 2Y, 2M, 2C, and 2K interpose therebetween the intermediate transfer belt 16 endlessly moved in the manner explained above. With this interposition, initial transfer nips for Y, M, C, and K are formed at a position where the front surface of the intermediate transfer belt 16 and the photosensitive members 2Y, 2M, 2C, and 2K abut each other.

To the initial transfer rollers 19Y, 19M, 19C, and 19K, an initial transfer bias is applied by a transfer bias power supply (not shown). With this, a transfer electric field is formed between the latent images on the photosensitive members 2Y, 2M, 2C, and 2K and the initial transfer rollers 19Y, 19M, 19C, and 19K.

Upon entering the initial transfer nip for K in association with the rotation of the photosensitive member 2K, the K toner formed on the surface of the photosensitive member 2K of the process unit 1K for K is initially transferred onto the intermediate transfer belt 16 from the photosensitive member 2K by the action of the transfer electric field and nip pressure. When the intermediate transfer belt 16 on which the K toner image has been initially transferred passes through the initial transfer nips for Y, C, and M in association with its endless movement, the Y, M, C toner images on the photosensitive members 2Y, 2M, and 2C are sequentially superposed for initial transfer. With such initial transfer of superposition, four-color toner images are formed on the intermediate transfer belt 16.

The secondary transfer roller 20 of the transfer unit 15 is disposed outside the loop of the intermediate transfer belt 16 to interpose the intermediate transfer belt 16 with the driven roller 18 inside the loop. With this interposition, a secondary transfer nip is formed at a position between the front surface of the intermediate transfer belt 16 and the secondary transfer roller 20 abut each other. To the secondary transfer roller 20, a secondary transfer bias is applied by a transfer bias power supply (not shown). With this application, a secondary-transfer electric field is formed between the secondary transfer roller 20 and the driven roller connected to ground.

Below the transfer unit 15 in the vertical direction is a paper-feeding cassette 30. The paper-feeding cassette 30 contains a bundle of recording sheets P as recording medium is disposed to be slidably attached to and removed from the printer 100. The paper-feeding cassette 30 causes a recording sheet P on top of the paper bundle to abut a paper-feeding roller 30a, which is rotated in a counterclockwise direction in FIG. 1 at a predetermined timing, thereby forwarding that recording sheet P toward a paper-feeding path 31.

Near the tail end of the paper-feeding path 31 are disposed paired resist rollers 32. The paired resist rollers 32 stops their rotation immediately upon interposing therebetween the recording sheet P forwarded from the paper-feeding cassette 30. Then, at a time at which the interposed recording sheet P can be synchronized in the secondary transfer nip explained above with the four-color toner images on the intermediate transfer belt 16, driving for rotation is restarted to forward the recording sheet P toward the secondary transfer nip.

The four-color toner images on the intermediate transfer belt 16 closely attached to the recording sheet P with the secondary transfer nip are collectively subjected to secondary transfer onto the recording sheet P under the influence of a secondary-transfer electric field and nip pressure to become a full-color toner image with white color of the recording sheet P. When passing through the secondary transfer nip, the recording sheet P having its surface formed with the full-color toner image is self stripped from the secondary transfer roller 20 and the intermediate transfer belt 16. Then, the recording sheet P is forwarded via a post-transfer conveyance path 33 to a fixing device 34, which will be explained further below.

On the intermediate transfer belt 16 after passing through the secondary transfer nip, residual transfer toner not transferred onto the recording sheet P is attached. This is cleaned from the belt surface by the belt cleaning device 21 abutting on the front surface of the intermediate transfer belt 16. The cleaning backup roller 22 disposed inside the loop of the intermediate transfer belt 16 backs up cleaning of the belt by the belt cleaning device 21 from the inside of the loop.

The fixing device 34 forms a fixing nip by fixing roller 34a containing a heat producing source (not shown), such as a halogen lamp, and a pressure roller 34b rotating while abuts thereon with a predetermined pressure. The recording sheet P forwarded inside the fixing device 34 is interposed at the fixing nip so that its unfixed toner-image carrying surface is closely attached to the fixing roller 34a. Then, the toner in the toner image is softened under the influence of heat and pressure, thereby causing the full-color image to be fixed.

The recording sheet P after delivered from the inside of the fixing device 34 passes through a post-fixing conveyance path 35 and then reaches a branching point between a paper-delivery path 36 and a pre-reversal conveyance path 41. On a side of the post-fixing conveyance path 35, a switching nail 42 driven for rotation about a rotation shaft 42a is disposed. With this rotation, a portion near the tail end of the post-fixing conveyance path 35 is closed or released. At the timing at which the recording sheet P is forwarded from the fixing device 34, the switching nail 42 stops at a rotation position indicated by a solid line in FIG. 1, thereby releasing the portion near the tail end of the post-fixing conveyance path 35. Thus, the recording sheet P enters the paper-delivery path 36 from the post-fixing conveyance path 35, and is then interposed between paired paper-delivery rollers 37.

When a one-side print mode is set with an input operation on an operating unit formed of a numeric keypad and the like (not shown) and a control signal sent from a personal computer or the like (not shown), the recording sheet P interposed between the paired paper-delivery rollers 37 is delivered as it is to outside the apparatus, and is then stacked in a stack portion, which is the upper surface of a upper cover 50.

On the other hand, when a both-side print mode is set, the rear end side of the recording sheet P conveyed through the paper-delivery path 36 with the front end side being interposed between the paired paper-delivery rollers 37 passes through the post-fixing conveyance path 35, and then the switching nail 42 is rotated to a position indicated by a one-dot-chain line in FIG. 1, thereby closing the portion near the tail end of the post-fixing conveyance path 35. At approximately the same time, the paired paper-delivery rollers 37 start reverse rotation. Then, the recording sheet P is conveyed with its rear end side directed to the head this time, entering into the pre-reversal conveyance path 41.

With the paired paper-delivery rollers 37 being reversely rotated, the paper sheet P enters into the pre-reversal conveyance path 41 of the reversing unit 40 to be conveyed as being directed downward from the upside in the vertical direction. After passing a portion between paired reversal conveyance rollers 43, the recording sheet P enters a reversal conveyance path 44 curved in a semicircular shape. Furthermore, as being conveyed along the curved shape, the recording sheet P has its upper and lower surfaces being reversed and its traveling direction downward from the upside in the vertical direction also being reversed, thereby being conveyed upward from the downside in the vertical direction. Then, after a full-color image is transferred through collective secondary transfer also on the other surface, the recording sheet P is delivered to outside the apparatus via the post-transfer conveyance path 33, the fixing device 34, the post-fixing conveyance path 35, the paper-delivery path 36, and then the paired paper-delivery rollers 37 in sequence.

Next, the optical scanning device 70 is explained in detail

Figure 2:
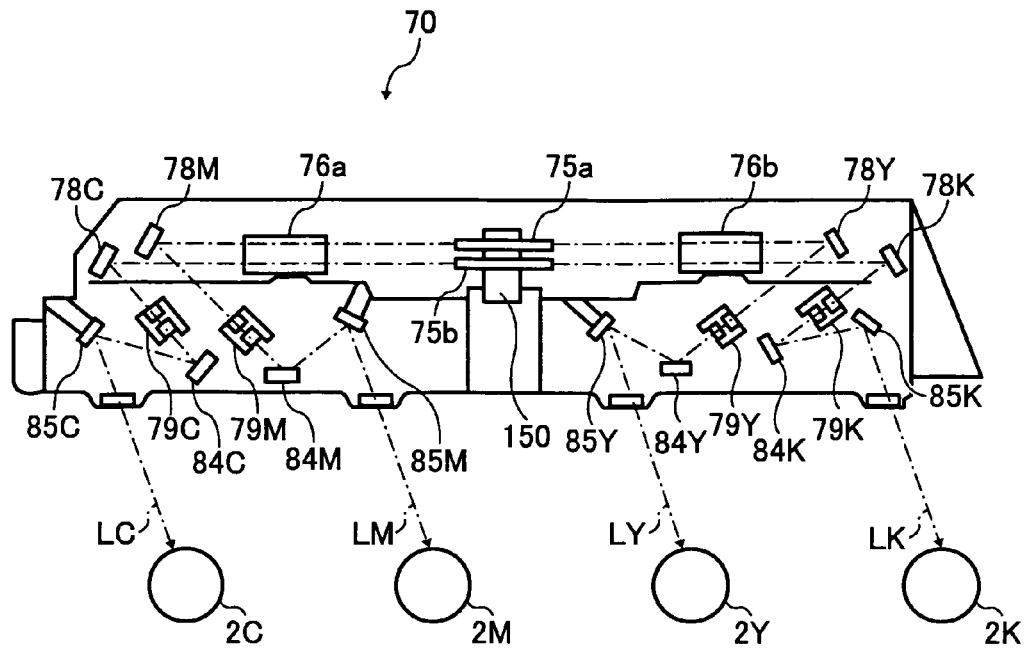
FIG. 2 is a schematic diagram of an optical scanning device shown in FIG. 1.
Figure 3:
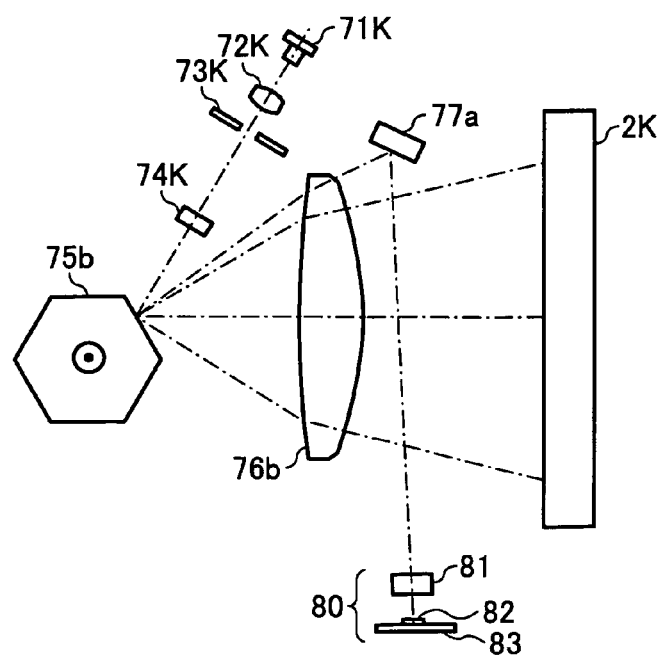
FIG. 3 is an overhead view of the optical scanning device.

FIG. 2 is a schematic diagram of the optical scanning device 70. FIG. 3 is an overhead view of the optical scanning device 70.

While writing onto the photosensitive member 2K for black is explained below as an example, the same applies to writing onto the photosensitive members for the other colors. In FIG. 3, although the photosensitive member 2K is depicted on a side portion of the optical scanning device 70 for the purpose of explanation, the photosensitive member 2K is actually disposed as shown in FIG. 2.

The optical scanning device 70 emits a writing beam LK from a laser diode 71K as a light source. The writing beam LK passes through a coupling lens 72K and an aperture 73K, and is formed in a predetermined shape. The writing beam LK passing through the aperture 73K enters an imaging lens 74K (cylindrical lens) to correct an error in optical face thereof. The writing beam LK passing through the imaging lens 74K then enters the side surface of a polygon mirror 75b. Upon entering the side surface of the polygon mirror 75b, the writing beam LK is deflected and scanned by the polygon mirror 75b. The writing beam LK is then collected by a scanning lens 76b (fθ lens). The writing beam LK collected by the scanning lens 76b is reflected on a mirror 77a before being scanned on the photosensitive member 2K, and then enters a synchronizing-signal detecting device 80. The synchronizing-signal detecting device 80 includes a lens 81, a light-receiving element 82, and a synchronization detection board 83 (signal-generation-circuit board).

When the writing beam LK enters the synchronizing-signal detecting device 80, a light-source signal converted based on input image data according to the synchronizing signal is input to the laser diode 71K. In response to the light-source signal, the laser diode emits light.

The writing beam LK emitted based on the input image data passes through the coupling lens 72K, the aperture 73K, and others in a manner as explained above, and is then reflected by the polygon mirror 75b to enter the scanning lens 76b. As shown in FIG. 2, the writing beam LK then passes through a reflection mirror 78K and a long lens 79K, and irradiates the photosensitive member 2K through reflection mirrors 84K and 85K.

Figure 4:
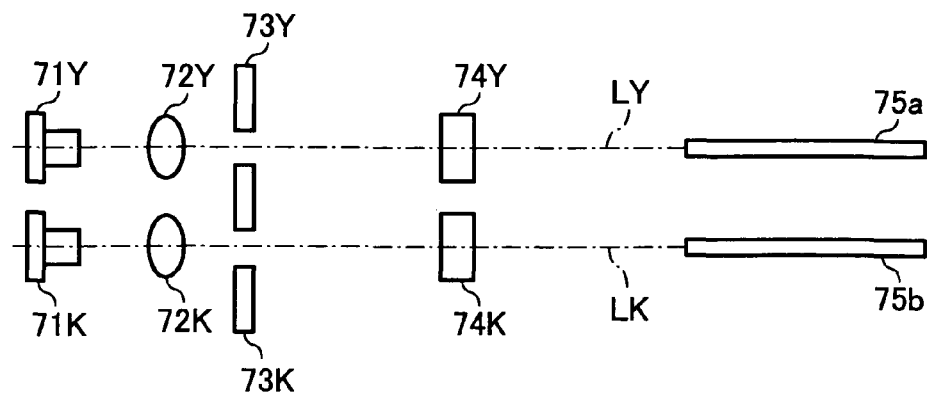
FIG. 4 is a schematic diagram of a portion where writing beams reach a polygon mirror from a light source.

As shown in FIG. 4, a laser diode 71Y, a coupling lens 72Y, an aperture 73Y, and an imaging lens 74 are disposed above the laser diode 71K, the coupling lens 72K, the aperture 73K, and the imaging lens 74K, respectively.

Figure 5:
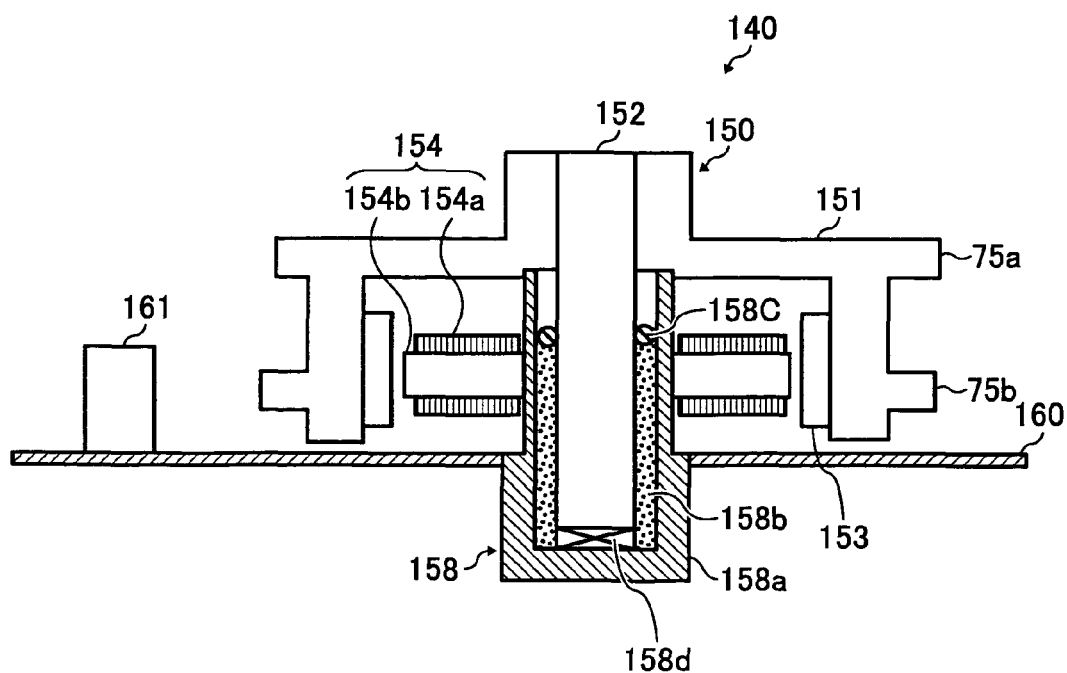
FIG. 5 is a cross section of a polygon scanner of the optical scanning device.

FIG. 5 is a cross section of a polygon scanner 140 as a deflection scanning unit. The polygon scanner 140 includes polygon mirrors 75a and 75b as rotating multifaceted mirrors, a polygon motor 150, and a circuit board 160 having mounted thereon electronic control components (not shown) for controlling the driving of the polygon motor 150.

The polygon motor 150 includes the polygon mirrors 75a and 75b, and has a cylindrical mirror rotor 151 made of aluminum. The mirror rotor 151 is fixed to a rotation shaft 152. The mirror rotor 151 has an inner perimeter surface on which a rotor magnet 153 is provided. Inside the mirror rotor 151 is provided a stator 154 in which a coil 154a is wound around a core member 154b. The stator 154 is disposed to face the rotor magnet 153, and is rotatably fixed to the rotation shaft 152 via a bearing portion 158. The bearing portion 158 has a cylindrical bearing holder 158a and magnetic fluid 158b enclosed in the bearing holder 158a by a seal washer 158c. Also, the bearing holder 158a has a bottom portion on which a thrust bearing 158d is provided. The rotation shaft 152 is inserted inside the bearing holder 158a, and the rotation shaft 152 is rotatably fixed to the thrust bearing 158d. The bearing holder 158a of the bearing portion 158 of the polygon motor 150 is fixed to the circuit board 160 having a connector 161. The connector 161 has mounted thereon a harness connected to a power supply unit of the device body. Via the connector 161, power is supplied to the polygon motor 150.

Because the polygon motor 150 rotates at high speed while deflecting and scanning a writing beam, the magnetic fluid 158b produces heat by friction to heat the bearing portion 158. Also, the electronic control components on the circuit board 160 produce heat. By such heat from the bearing portion 158 of the polygon motor as a heat producing portion of the polygon scanner 140 and the electronic control components on the circuit board, the temperature inside the optical scanning device 70 increases. This causes heat deformation of optical components, such as a lens and mirror, and produces a scaling deviation. Consequently, image quality is lowered. To prevent the temperature inside the optical scanning device 70 from increasing, according to the embodiment, heat produced by the heat producing portion of the polygon scanner 140 is efficiently let out of the optical scanning device 70. This configuration is specifically explained below.

Figure 6:
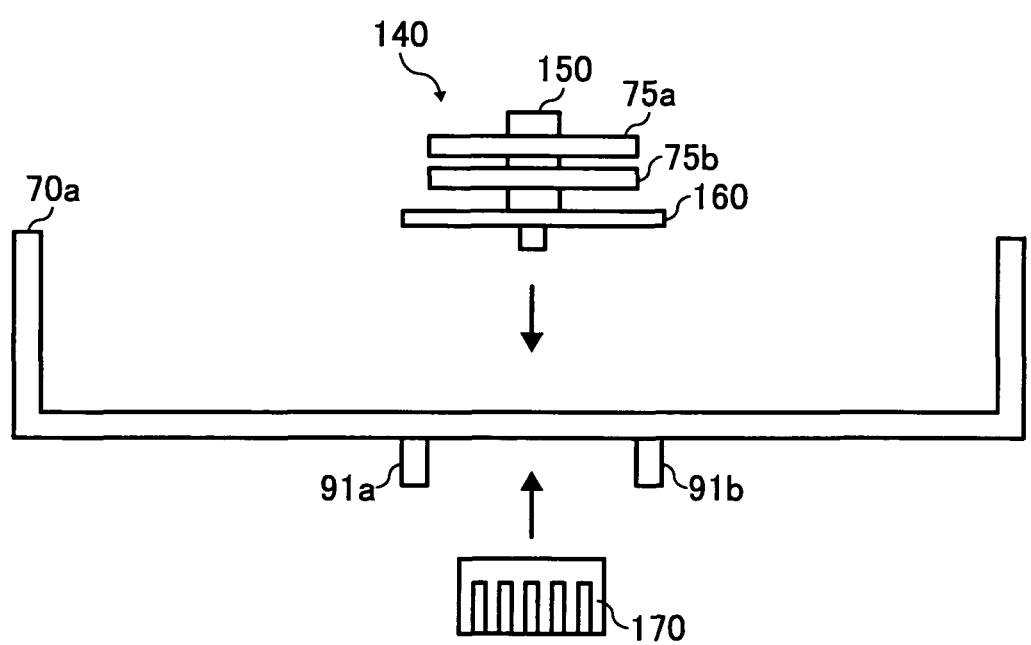
FIG. 6 is an enlarged view of a portion of the optical scanning device where the polygon scanner is mounted.

FIG. 6 is an enlarged view of a portion of the optical scanning device 70 where the polygon scanner 140 is mounted.

As shown in FIG. 6, the polygon scanner 140 is directly mounted on an inner perimeter surface of the bottom portion of a body 70a of the optical scanning device 70. Also, a heat dissipating unit is mounted to face the polygon scanner 140 over the body 70a. In this manner, in the present embodiment, the polygon scanner is not interposed between an upper case and a lower case for unitization, but is directly mounted on the body 70a, thereby reducing the number of components and the price of the optical scanning device.

Also, near the portion on the bottom of the outer surface of the body 70a where the heat dissipating unit is mounted, wall portions 91a and 91b are provided that face each other over the heat dissipating unit.

Figure 7A:
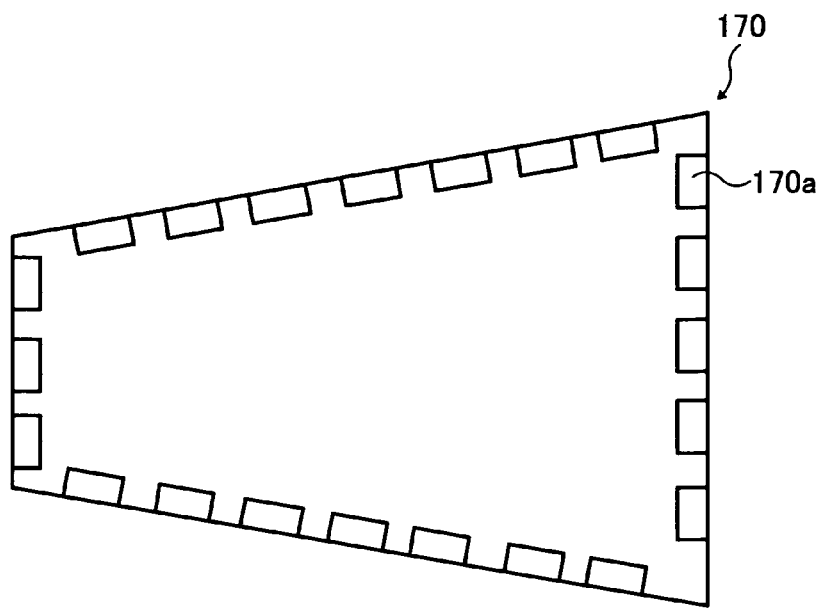
FIGS. 7A and 7B are schematic diagrams of a heat dissipating unit shown in FIG. 6.
Figure 7B:
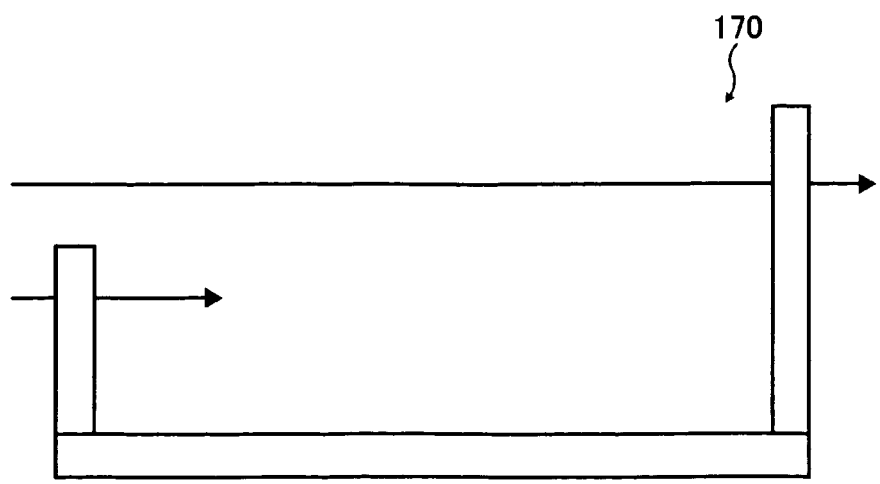

FIGS. 7A and 7B are schematic diagrams of a heat dissipating unit 170. The heat dissipating unit 170 is formed by using an aluminum sheet through punching into a fin shape and bending to form heat dissipating fins 170a on four sides. The width of the heat dissipating unit 170 is gradually increased from an upstream side to a downstream side of an air flowing direction. With this, compared with the one linearly shaped, the possibility that air not heated by the heat dissipating fins 170a makes contact with each of the heat dissipating fins 170a is increased, thereby efficiently cooling the polygon scanner 140. Also, as shown in FIG. 7B, among the heat dissipating fins 170a formed on sides of the metal plate facing in the air flowing direction, the height of the heat dissipating fins formed on a side on the downstream side of the air flowing direction is higher than the height of the heat dissipating fins formed on a side on the upstream side of the air flowing direction. This increases the possibility that air not heated by the heat dissipating fins makes contact with the heat dissipating fins formed on the sides facing in the air flowing direction on the downstream side of the air flowing direction, thereby efficiently cooling the polygon scanner 140.

Figure 8:
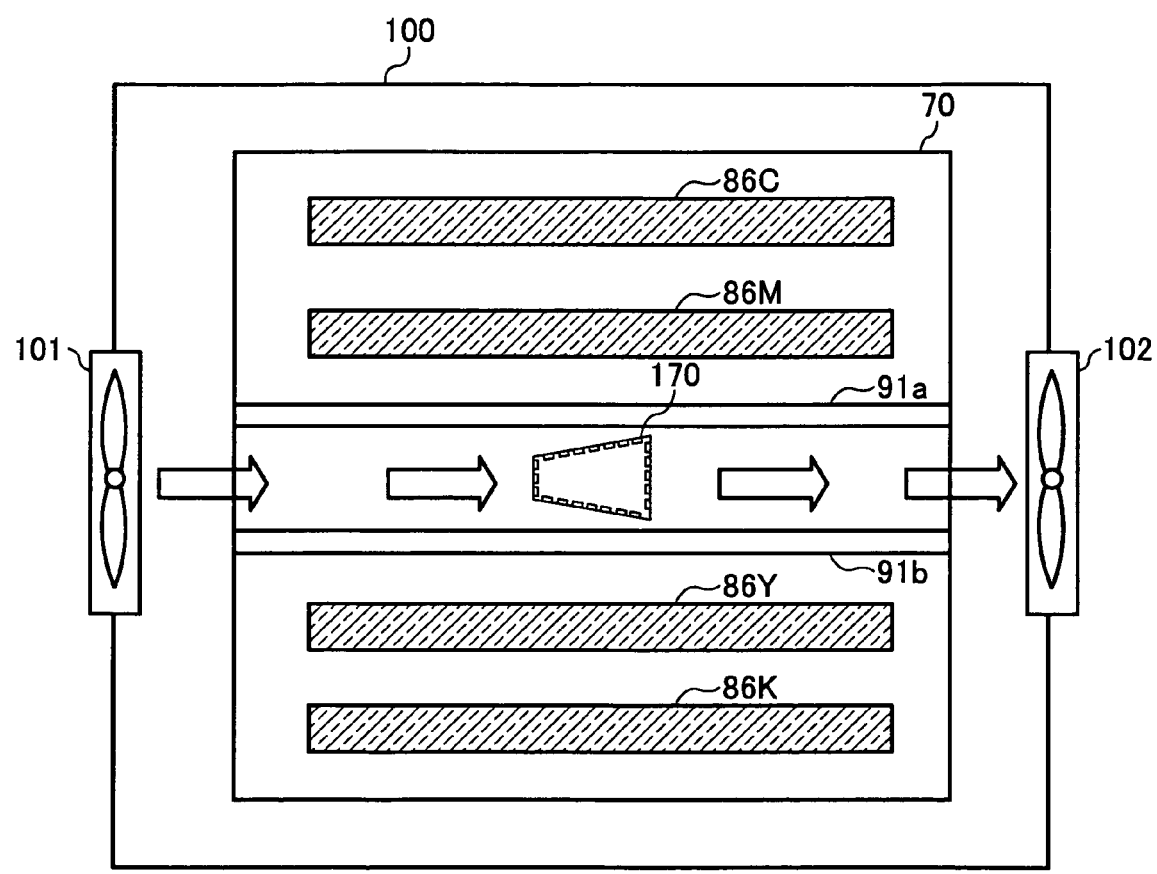
FIG. 8 is a bottom view of the optical scanning device.

FIG. 8 is a bottom view of the optical scanning device 70. As shown in FIG. 8, an air intake fan 101 is provided as an air blowing unit on the left side of the printer 100 in FIG. 8, whilst an exhaust fan is provided on the right side thereof in FIG. 8. An air flow is formed from the air intake fan 101 to the exhaust fan 102 on the bottom of the outer surface of the body 70a.

With one end of each of the wall portions 91a and 91b facing the air intake fan 101, whist the other end thereof facing the exhaust fan 102, the wall portions are provided to be substantially parallel to the air flow. With this, a flow path is formed in which air taken in by the air intake fan 101 from the outside of the device flows in a space between the wall portions 91a and 91b, moves in the space in a direction indicated by arrows in FIG. 8, and is then exhausted by the exhaust fan 102 to the outside of the device. Through dust-proof glasses 86K, 86Y, 86M, and 86C, writing beams LK, LY, LM, and LC are irradiated on the photosensitive members.

Heat produced from a heat producing source of the polygon scanner 140 is transmitted from the body 70a to the heat dissipating unit 170, and is then dissipated by the heat dissipating fins 170a to the outside of the optical scanning device 70. This can suppress heat of the polygon scanner 140 from being accumulated in the optical scanning device 70. Also, since an air-flow path is formed by the wall portions 91a and 91b, air heated by the heat dissipating fins 170a does not stay around the heat dissipating fins 170a. With this, heat of the polygon scanner 140 can be efficiently dissipated by the heat dissipating fins 170a to the outside of the optical scanning device.

Figure 9:
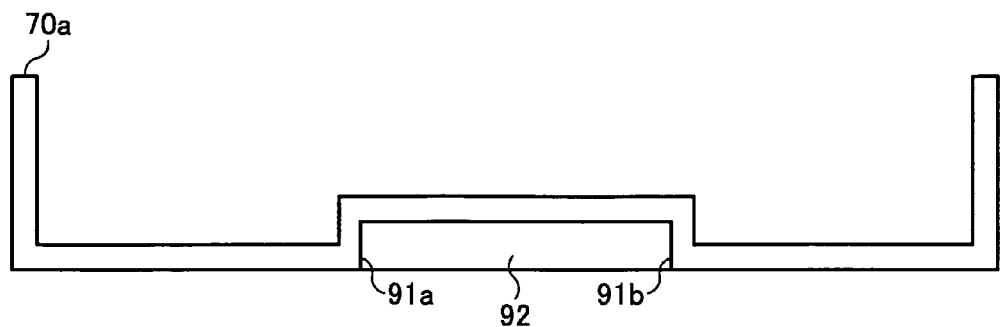
FIG. 9 is a schematic diagram of a body shown in FIG. 6 having a bottom with a concave portion.

In FIG. 6, the wall portions 91a and 91b are formed to protrude from the body 70a. Alternatively, as shown in FIG. 9, a concave portion 92 can be provided by recessing the bottom of the body 70a inwardly to form the wall portions 91a and 91b.

Figure 10:
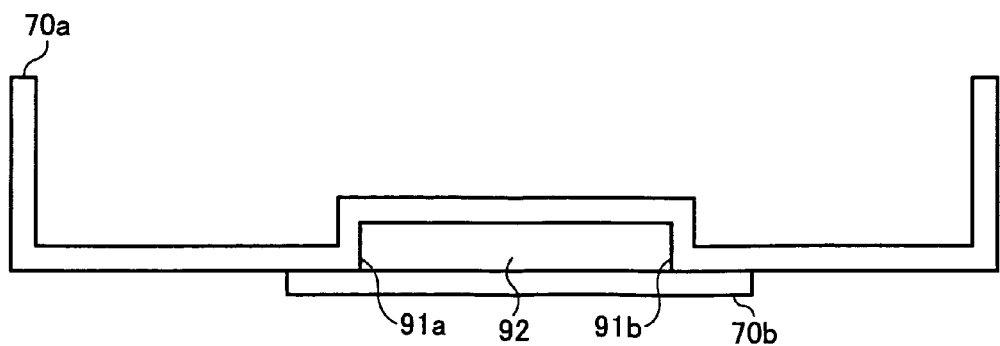
FIG. 10 is a schematic diagram of the body having a bottom with a duct formed of wall portions and a lid member.

Besides, as shown in FIG. 10, an opening side of the concave portion 92 can be covered by a lid member 70b to form a rectangular duct. With the wall portions 91a and 91b and the lid member 70b forming a duct, the velocity of air flow in the flow path can be increased, whereby the heat dissipating fins 170a can be more efficiently cooled.

Because of the wall portions 91a and 91b and the lid member 70b forming a duct, the heat dissipating fins 170a of the heat dissipating unit 170 exposed to the flow path are prevented from making contact with other components and damaging the components, which improves assembly process, and the like.

Figure 11:
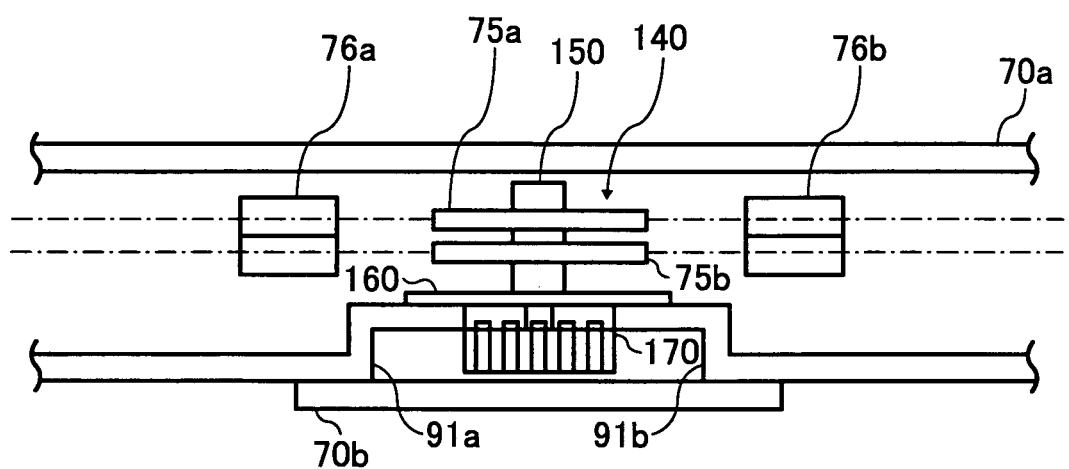
FIG. 11 is a schematic diagram for explaining a relation between a scanning lens and a flow path.

As shown in FIG. 11, the wall portions 91a and 91b are preferably formed so that the flow path does not three-dimensionally cross a lens, such as the scanning lens 76b or the long lens 79 (not shown in FIG. 11), provided on an optical path from the polygon mirror to the photosensitive member and extends in a main scanning direction. If the flow path three-dimensionally crosses such a lens, air flow in the flow path cools a portion where the lens crosses, thereby causing a difference in temperature of the lens. That is, if the flow path crosses a lens extending in the main scanning direction, a change in temperature of the lens in the main scanning direction increases. This causes a large difference in degree of expansion and contraction by heat in the main scanning direction, resulting in a bend of optical components. Consequently, image quality is lowered.

With the wall portions 91a and 91b being provided so that the flow path does not three-dimensionally cross the lens extending in the main scanning direction, it is possible to suppress a difference in temperature of the lens in the main scanning direction and also suppress image quality degradation.

The wall portions 91a and 91b are provided so that the air flow is parallel to the lens extending in the main scanning direction. With this, a difference in temperature of the lens extending in the main scanning direction can be further suppressed.

Although a portion below scanning lenses 76a and 76b is not taken as a flow path in FIG. 11, the configuration can be such that the wall portions 91b and 91a are formed so that the portion below the scanning lenses is also used as a flow path to cool the scanning lens in their entirety.

It is more effective to provide the wall portions 91a and 91b so that the flow path does not three-dimensionally crosses a plurality of reflection mirrors 78K, 78Y, 78M, and 78C; 84K, 84Y, 84M, and 84C; and 85K, 85Y, 85M, and 85C. With this, a supporting portion that supports one end of each reflection mirror of the body 70a has substantially the same amount of deformation as that of a supporting portion that supports the other end of each reflection mirror thereof. Further, if the wall portions 91a and 91b are provided so that the flow path is parallel to the plurality of reflection mirrors 78K, 78Y, 78M, and 78C; 84K, 84Y, 84M, and 84C; and 85K, 85Y, 85M, and 85C, the amount of deformation of the supporting portions due to heat can be more accurately made substantially the same.

A distance from the center of the flow path to each of the optical components for Y and K is made equal to a distance from the center of the flow path to each of the optical components for C and M. With this, heat deformation due to the influence of air flowing through the flow path of each of the optical components for Y and K can be made substantially equal to heat deformation due to the influence of air flowing through the flow path of each of the optical components for C and M. Thus, image quality degradation such as color shift can be suppressed.

Next, modifications of the embodiment are explained. According to a modification of the embodiment, the optical scanning device 70 includes a core body 700 that houses optical components provided on an optical path between the light source 71 to the scanning lenses 76a and 76b, and the sub-body 710 that houses optical components provided on an optical path after passing through the scanning lenses 76a and 76b to the photosensitive member.

Specifically, the core body 700 houses the laser diodes 71K, 71Y, 71M as a light source, and 71C, the coupling lenses 72K, 72Y, 72M, and 72C, apertures 73K, 73Y, 73M, and 73C, the imaging lenses 74K, 74Y, 74M, and 74C, the polygon scanner 140, and the scanning lenses 76a and 76b.

Figure 12:
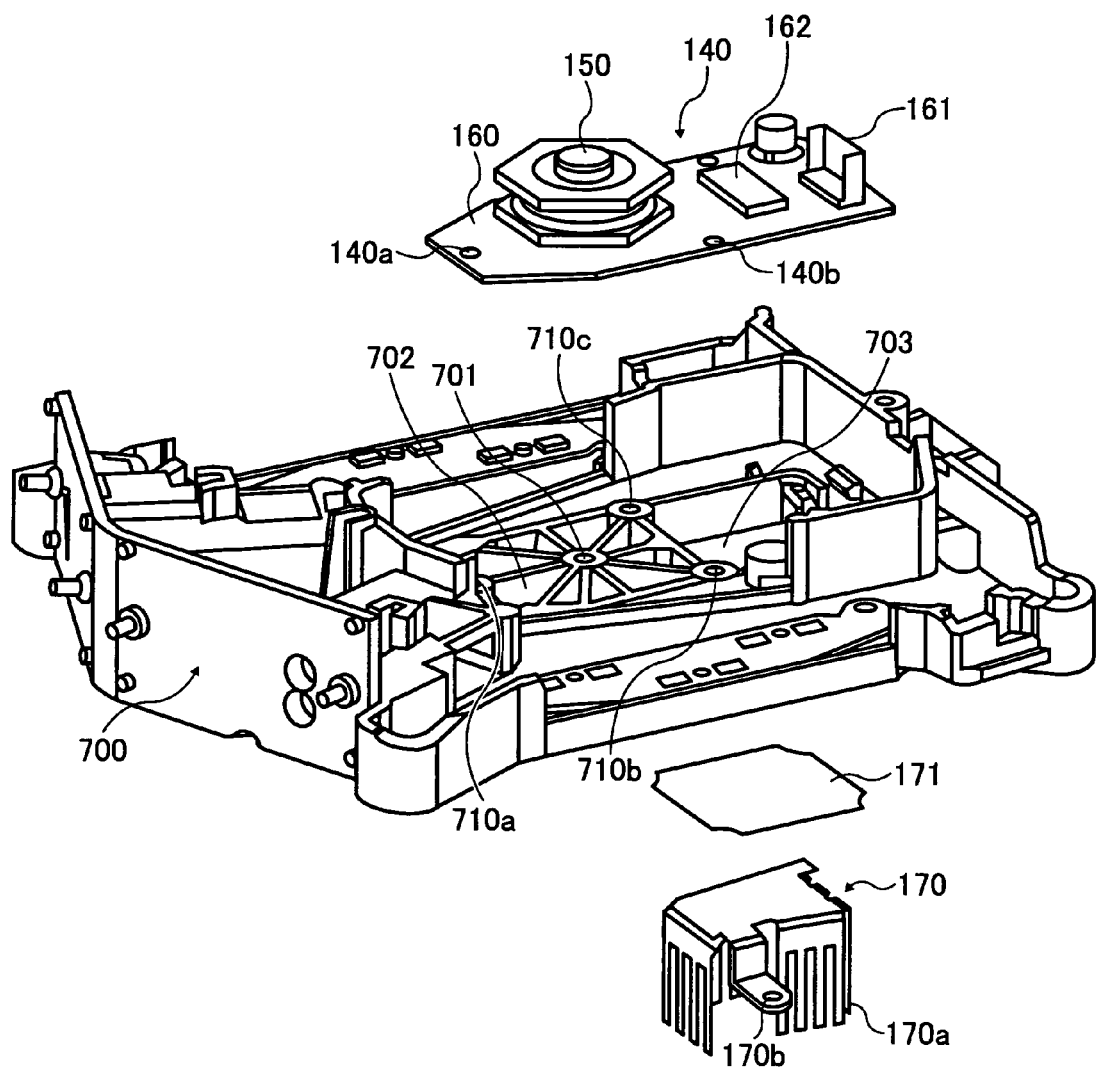
FIG. 12 is a schematic diagram for explaining how a polygon scanner and others are mounted on a core body.

FIG. 12 is a schematic diagram for explaining how the polygon scanner 140 and the heat dissipating unit 170 are mounted on the core body 700.

As shown in FIG. 12, the polygon scanner 140 is not interposed between an upper case and a lower case for unitization, but is directly screwed to the core body 700. That is, screw holes 140a and 140b and another screw hole (not shown) are provided at three positions on the circuit board 160 of the polygon scanner 140. These screw holes are aligned with screw holes 710a, 710b, and 710c provided on the core body 700 for screwing. In this manner, the polygon scanner 140 is directly mounted on the core body 700, resulting in less number of components as well as less cost of the device.

The core body 700 is provided with a mounting seat 701 for positioning the polygon scanner 140 in a vertical direction. With the bearing portion 158 being inserted in the mounting seat 701, the polygon scanner 140 is positioned in the vertical direction. Also, the core body 700 has a polygon-scanner mounting portion provided with a plurality of communicating portions 702 communicating with the outside. With this, a part of the polygon scanner 140 directly faces the flow path.

The core body 700 is also provided with a heat-dissipating-unit mounting hole 703 for thermally connecting the heat dissipating unit 170 and the polygon scanner as a deflection scanning unit together.

After the polygon scanner 140 is screwed and fixed to the core body 700, a heat-transfer sheet 171 and the heat dissipating unit 170 are inserted from the bottom of the core body 700 into the heat-dissipating-unit mounting hole 703 for mounting. The heat-transfer sheet 171 is a commercially-available sheet having elasticity like a rubber. The heat-transfer sheet 171 can have self-adhesiveness. With the heat-transfer sheet provided between the heat dissipating unit 170 and the polygon scanner 140, a dimensional deviation of the core body 700 and the heat dissipating unit 170 can be absorbed by the thickness of the heat-transfer sheet 171. Thus, heat of the polygon scanner can be directly transferred to the heat dissipating unit.

The heat dissipating unit 170 is screwed by a screw portion 170b to a mounting seat (not shown) on the core body 700.

In this manner, the heat dissipating unit 170 is inserted in the heat-dissipating-unit mounting hole 703 to abut the polygon scanner 140 via the heat-transfer sheet 171. With this, the heat dissipating unit 170 and the polygon scanner 140 can be thermally connected to each other. As a result, heat of the polygon scanner 140 can be directly transferred to the heat dissipating unit 170. Thus, the polygon scanner 140 can be efficiently cooled.

The heat dissipating unit 170 is contacted with a portion facing an electronic control component 162, which is a heat producing source of the polygon scanner, over the circuit board 160. This enables more efficient cooling of the polygon scanner 140. The electronic control component 162 is provided on the heat dissipating unit 170 side of the circuit board 160 to be directly and thermally connected to the heat dissipating unit 170. This enables further more efficient cooling of the polygon scanner 140.

Figure 13:
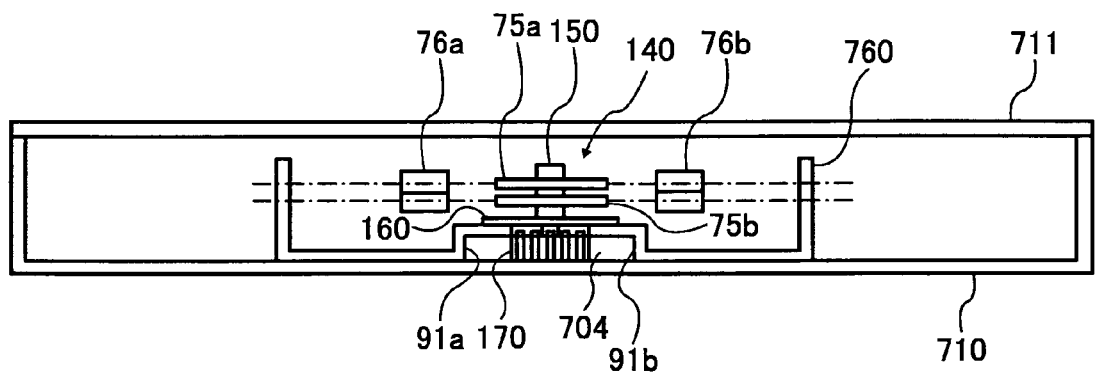
FIG. 13 is an enlarged view of a portion of an optical scanning device where a polygon scanner is mounted according to modification of the embodiment.

FIG. 13 is an enlarged view of a main portion of the optical scanning device 70 according to the modification.

The optical scanning device 70 includes the core body 700, the reflection mirrors 78K, 78Y, 78M, and 78C; 84K, 84Y, 84M, and 84C; and 85K, 85Y, 85M, and 85C, and the long lens 79K, 79Y, 79M, and 79C in the sub-body 710, and a covering member 711 that encloses the inside of the device.

As shown in FIG. 13, a concave portion 704 is formed by recessing the bottom of the core body 700 to form a space between the core body 700 and the sub-body 710, and this space is taken as a flow path. With this, a part of the core body 700 that houses the polygon scanner 140 can be contacted with the flow path, allowing the core body 700 to be cooled. Thus, the inside of the writing device can be efficiently cooled. The sub-body 710 and the core body 700 form a duct, thereby eliminating a component dedicated to form a duct (lid member 70b).

The length from the front side to the back side of the core body 700 (the length in an air flowing direction) is assumed to be substantially equal to the length from the front side to the back side of the sub-body 710 (the length in an air flowing direction).

Figure 14:
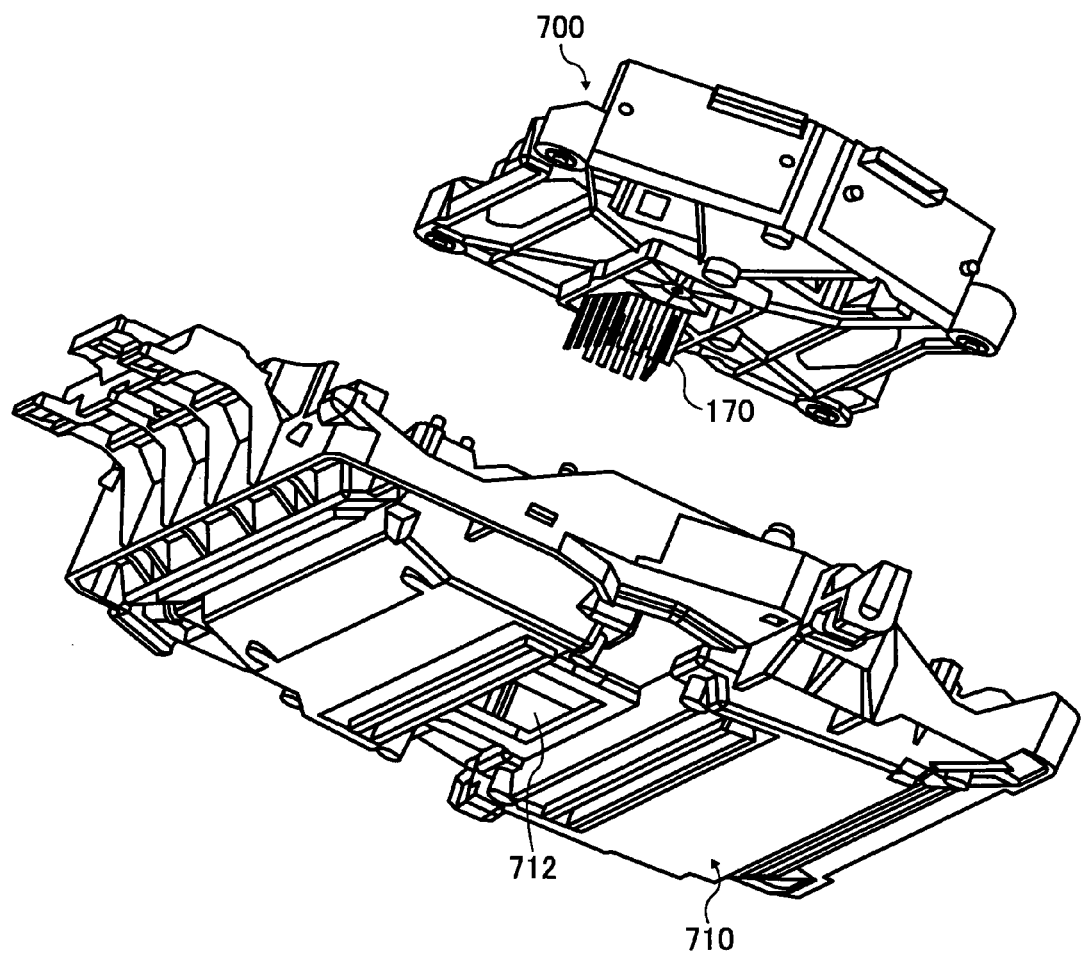
FIG. 14 is a schematic diagram for explaining how a core body is mounted on a sub-body.
Figure 15:
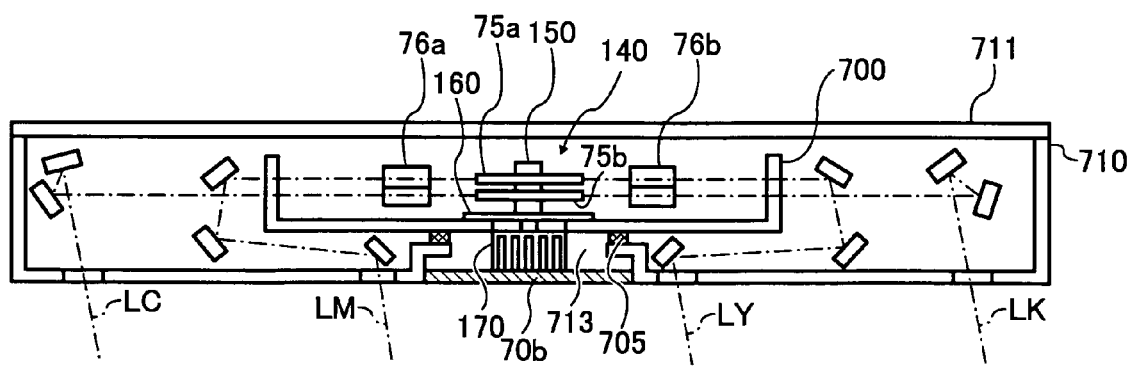
FIG. 15 is a schematic diagram of a main portion of an optical scanning device according to another modification of the embodiment.

With reference to FIGS. 14 and 15, another modification of the embodiment is explained in which the core body 700 and the sub-body 710 form a flow path. FIG. 14 is a schematic diagram for explaining how the core body is mounted on the sub-body 710. FIG. 15 is a schematic diagram of a main portion of an optical scanning device according to the modification.

As shown in FIGS. 14 and 15, a concave portion 713 is formed by recessing a part of the bottom of the sub-body 710, and an opening 712 is formed on a part of the bottom of that concave portion 713.

The heat dissipating unit 170 mounted on the core body 700 is inserted in the opening 712 to protrude from the concave portion 713 of the sub-body 710. Also, the communicating portions 702 and the mounting seat 701 of the core body 702 are inserted in the opening 712 to allow a part of the polygon scanner 140 to make contact with air in the flow path. A sealing member is attached to a boundary between the sub-body 710 and the core body 700 to prevent foreign substances, such as motes, from flowing into the sub-body 710 from the boundary between the sub-body 710 and the core body 700.

The opening 712 of the concave portion 713 is covered by the lid member 70b to form a duct extending from the front side to the back side in FIG. 14. In this case, a flow path is also formed in the duct formed of the concave portion 713 of the sub-body 710 and the lid member 70b, whereby the heat dissipating fins are sufficiently cooled.

As explained above, according to the embodiment, the polygon scanner 140 as a deflection scanning unit is directly mounted on the body, and the heat dissipating unit 170 is mounted at a position on the outer surface of the body to face the polygon scanner. With this, heat of the polygon scanner can be dissipated to the outside of the device. Thus, an increase in temperature inside the device can be suppressed, which suppresses heat deformation of optical components, such as an imaging lens. The wall portions 91a and 91b that extend in a direction in which air flows to face each other over the heat dissipating unit 170 are provided to form an air-flow path. With this, the heat dissipating unit 170 can be efficiently cooled. Accordingly, the heat dissipating unit 170 efficiently dissipates heat of the polygon scanner 140 to the outside of the device. The lower case and the upper case with which the polygon scanner 140 is enclosed are eliminated, and the polygon scanner 140 is directly mounted on the body 70a. This can reduce the number of components, and also reduce the price of the device.

The lid member 70b covering the heat dissipating unit 170 forms a duct with the wall portions 91a and 91b. With this, the velocity of air flow through the flow path can be increased. Thus, the heat dissipating unit 170 can be more efficiently cooled.

The concave portion 92 extending in an air flowing direction can be formed on the outer surface of the body to provide the wall portions 91a and 91b facing each other over the heat dissipating unit 170. With this, the flow path is prevented from protruding from the outer surface. Thus, the wall portions 91a and 91b forming a flow path can be prevented from bumping into other components and damaging the components.

The wall portions 91a and 91b are provided not to be three-dimensionally superposed on a lens, and accordingly, the flow path is prevented from being superposed on the lens. With this, cooling of a part of the lens by air flow in the flow path is suppressed, which suppresses an occurrence of a temperature difference on the lens.

The wall portions 91a and 91b are provided to be parallel to the lens. Accordingly, the flow path is parallel to the lens, which further prevents an occurrence of a temperature difference on the lens.

The wall portions are formed so that the distance from the center of the flow path formed by the wall portions 91a and 91b to each of the lenses symmetrically provided with respect to the center of the polygon motor as a boundary is made equal. With this, the temperatures of the lenses symmetrically provided can be substantially the same. Thus, the amount of heat deformation due to the temperature can be substantially equalized.

The wall portions 91a and 91b are provided not to be three-dimensionally superposed on the reflection mirrors. With this, the amount of heat deformation of the supporting portion that supports one end of each reflection mirror can be substantially the same as that of the supporting portion that supports the other end of each reflection mirror. Thus, each reflection mirror can be prevented from tilting.

The wall portions 91a and 91b are provided to be parallel to the reflection mirrors. With this, the amount of heat deformation of the supporting portion that supports one end of each reflection mirror can be made closer to that of the supporting portion that supports the other end of each reflection mirror.

The wall portions 91a and 91b are formed so that distances from the center of the flow path formed by the wall portions 91a and 91b to the respective reflection mirrors symmetrically provided with respect to the center of the polygon motor as a boundary are equal. With this, the temperatures of the supporting portions that support the reflection mirrors can be substantially equal to each other. Thus, the amount of heat deformation of the reflection-mirror supporting portions provided symmetrically can be substantially equalized.

By thermally connecting the polygon scanner 140 and the heat dissipating unit 170 together, heat of the polygon scanner 140 can be efficiently transferred to the heat dissipating unit 170, which efficiently cools the polygon scanner 140.

The heat-transfer sheet 171 is provided between the polygon scanner 140 and the heat dissipating unit 170, thereby ensuring the thermal connection between the polygon scanner 140 and the heat dissipating unit 170.

A part of the polygon scanner 140 is configured to face the flow path. With this, the polygon scanner 140 can be directly cooled by air flow in the flow path, whereby the polygon scanner can be efficiently cooled.

A part of the outer surface of the core body 700 that houses the polygon scanner faces the flow path. With this, the core body 700 heated by the polygon scanner 140 can be cooled, which suppresses an increase in temperature inside the device.

A concave portion extending in an air-flow direction is formed on the outer surface of the core body 700, and a lid portion that covers an opening portion of the concave portion on the core body 700 is formed on the sub-body 710. With this, the core body 700 and the sub-body 710 can form a duct. Thus, compared with a duct formed of a lid member or the like, the number of components can be reduced.

Heat dissipating fins made of a metal plate are used as the heat dissipating unit 170. With this, the heat dissipating unit 170 can be inexpensively manufactured, and also the cost of the device can be reduced. With the fins, the hear-dissipating area of the heat dissipating unit 170 can be increased, and heat is efficiently dissipated.

The height of fins on an upstream side of the air-flow direction is lower than the height of fins on a downstream side thereof, allowing air not heated by the fins on the upstream side to be contacted with a high portion of the fins on the downstream side. With this, the fins on the downstream side can also sufficiently dissipate heat, thereby increasing heat-dissipating efficiency of the heat dissipating unit 170.

The image forming apparatus of the embodiment includes such an optical scanning device as explained above, thereby providing an excellent image without image quality degradation, such as a color shift.

One end of each wall portion is disposed near a fan that takes outside air inside the device. With this, outside air can be efficiently taken in the flow path formed by the wall portions.

As set forth hereinabove, according to an embodiment of the present invention, a heat dissipating unit that dissipates heat of a deflection scanning unit is mounted to face the deflection scanning unit. Therefore, heat of the deflection scanning unit is transmitted to the heat dissipating unit and is dissipated from the heat dissipating unit to the outside. With this, an increase in temperature inside the device can be suppressed, whereby heat deformation of optical components, such as an imaging lens, can be suppressed. Besides, wall portions form a flow path of air flowing to the heat dissipating unit, resulting in efficient cooling of the heat dissipating unit. With this, heat of the deflection scanning unit can be efficiently dissipated to the outside of the device by the heat dissipating unit. Furthermore, the lower case and the upper case with which the deflection scanning unit is enclosed are eliminated, and the deflection scanning unit is directly mounted on the body. With this, the number of components can be reduced, and the price of the device can be reduced.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a light source that emits a light beam;
   a deflection scanning unit that deflects the light beam in a main scanning direction and scans the light beam on a target surface;
   a plurality of lenses that are located on an optical path of the light beam from the deflection scanning unit to the target surface;
   a body that houses the light source, the deflection scanning unit, and the lenses, the deflection scanning unit being directly mounted on an inner surface of the body;
   a heat dissipating unit that dissipates heat of the deflection scanning unit, the heat dissipating unit being outside of the body and at least partially on an outer surface of the body, the heat dissipating unit adjoining a position on the body at which the deflection scanning unit is directly mounted to the body;
   an air blowing unit that blows air;
   a pair of wall portions that face each other with the heat dissipating unit between the wall portions, the pair of wall portions extending in an air-flow direction in which the air flows to form an air-flow path; and
   a hole in the outer surface of the body, the heat dissipating unit thermally connected to the deflection scanning unit through the hole,
   wherein the heat dissipating unit is attached to the outer surface of the body by a screw,
   the heat dissipating unit is one of in direct contact with a circuit board of the deflection scanning unit through the hole and in direct contact with a heat-transfer sheet,
   the wall portions are configured to direct air from the air blowing unit across the heat dissipating unit to transfer heat away from the heat dissipating unit,
   a width of the heat dissipating unit gradually increases from an upstream side to a downstream side of an air flowing direction, and
   a height of the heat dissipating unit on an upstream side of the air-flow direction is shorter than a height of the heat dissipating unit on a downstream side of the air-flow direction.

2. The optical scanning device according to claim 1, further comprising a lid member that extends in the air-flow direction to cover the heat dissipating unit together with the wall portions.

3. The optical scanning device according to claim 1, wherein the outer surface of the body is recessed and the wall portions are part of the recessed outer surface.

4. The optical scanning device according to claim 1, wherein the wall portions do not overlap the lenses in at least one direction perpendicular to the airflow direction.

5. The optical scanning device according to claim 4, wherein the wall portions extend in parallel to the lenses.

6. The optical scanning device according to claim 5, wherein the lenses are arranged symmetrically with respect to the deflection scanning unit, and equally distanced from a center of the air-flow path.

7. The optical scanning device according to claim 1, further comprising a plurality of reflection mirrors that reflect the light beam deflected by the deflection scanning unit,
   wherein the wall portions do not overlap the reflection mirrors in at least one direction perpendicular to the airflow direction.

8. The optical scanning device according to claim 7, wherein the wall portions extend in parallel to the reflection mirrors.

9. The optical scanning device according to claim 8, wherein the reflection mirrors are arranged symmetrically with respect to the deflection scanning unit, and equally distanced from a center of the air-flow path.

10. The optical scanning device according claim 1, wherein the heat dissipating unit is in direct contact with the heat-transfer sheet that is in direct contact with the circuit board through the hole,
    the heat-transfer sheet is located between the deflection scanning unit and the heat dissipating unit, and
    the heat-transfer sheet is not part of the body.

11. The optical scanning device according to claim 1, wherein a part of the deflection scanning unit faces the air-flow path.

12. The optical scanning device according to claim 1, wherein the body includes
a core body that houses at least the light source and the deflection scanning unit; and
a sub-body that houses other optical components,
the core body is separable from the sub-body, and
a part of an outer surface of the core body defines the air-flow path.

13. The optical scanning device according to claim 12, wherein the outer surface of the core body is recessed and the wall portions are part of the recessed outer surface, and
the sub-body includes a lid member that covers an opening of the recess.

14. The optical scanning device according to claim 1, wherein the deflection scanning unit is a polygon scanner that includes
a rotating multifaceted mirror that deflects the light beam in a main scanning direction and scans the light beam on the target surface;
a polygon motor that rotates the rotating multifaceted mirror; and
the circuit board that is mounted with an electronic control component that controls driving of the polygon motor.

15. The optical scanning device according to claim 1, wherein the heat dissipating unit is a metal plate including heat dissipating fins.

16. The optical scanning device according to claim 15, wherein
the heat dissipating fins are formed by bending four sides of the metal plate.

17. The image forming apparatus according to claim 1, wherein the pair of wall portions are spaced apart from the heat dissipating unit.

18. An image forming apparatus comprising an optical scanning device that includes:
a light source that emits a light beam;
a deflection scanning unit that deflects the light beam in a main scanning direction and scans the light beam on a target surface;
a plurality of lenses that are located on an optical path of the light beam from the deflection scanning unit to the target surface;
a body that houses the light source, the deflection scanning unit, and the lenses, the deflection scanning unit being directly mounted on an inner surface of the body;
a heat dissipating unit that dissipates heat of the deflection scanning unit, the heat dissipating unit being outside of the body and at least partially on an outer surface of the body, the heat dissipating unit adjoining a position on the body at which the deflection scanning unit is directly mounted to the body;
an air blowing unit that blows air;
a pair of wall portions that face each other with the heat dissipating unit between the wall portions, the pair of wall portions extending in an air-flow direction in which the air flows to form an air-flow path; and
a hole in an outer surface of the body, the heat dissipating unit thermally connected to the deflection scanning unit through the hole,
wherein the heat dissipating unit is attached to the outer surface of the body by a screw,
the heat dissipating unit is one of in direct contact with a circuit board of the deflection scanning unit through the hole and in direct contact with a heat-transfer sheet,
the wall portions are configured to direct air from the air blowing unit across the heat dissipating unit to transfer heat away from the heat dissipating unit,
a width of the heat dissipating unit gradually increases from an upstream side to a downstream side of an air flowing direction, and
a height of the heat dissipating unit on an upstream side of the air-flow direction is shorter than a height of the heat dissipating unit on a downstream side of the air-flow direction.

19. The image forming apparatus according to claim 18, wherein the air blowing unit takes outside air into the image forming apparatus, and
one end of each of the wall portions is located near the air blowing unit.

20. The image forming apparatus according to claim 18, wherein the pair of wall portions are spaced apart from the heat dissipating unit.

21. The image forming apparatus according to claim 18,
wherein the heat dissipating unit is in direct contact with the heat-transfer sheet that is in direct contact with the circuit board through the hole, and
the heat-transfer sheet is located between the deflection scanning unit and the heat dissipating unit.

22. An optical scanning device, comprising:
a light source that emits a light beam;
a deflection scanning unit that deflects the light beam in a main scanning direction and scans the light beam on a target surface;
a plurality of lenses that are located on an optical path of the light beam from the deflection scanning unit to the target surface;
a body that houses the light source, the deflection scanning unit, and the lenses, the deflection scanning unit being directly mounted on the body;
a heat dissipating unit that dissipates heat of the deflection scanning unit, the heat dissipating unit being directly attached to the body by a screw from outside the body and in direct contact with the deflection scanning unit,
a width of the heat dissipating unit gradually increases from an upstream side to a downstream side of an air flowing direction, and a height of the heat dissipating unit on an upstream side of the air-flow direction is shorter than a height of the heat dissipating unit on a downstream side of the air-flow direction;
an air blowing unit that blows air; and
a pair of wall portions that face each other with the heat dissipating unit between the wall portions, the pair of wall portions extending in an air-flow direction in which the air flows to form an air-flow path,
wherein the wall portions are configured to direct air from the air blowing unit across the heat dissipating unit to transfer heat away from the heat dissipating unit.

* * * * *